July 25, 1939. T. R. WEBER 2,167,598
LEAF SPRING
Filed May 14, 1938
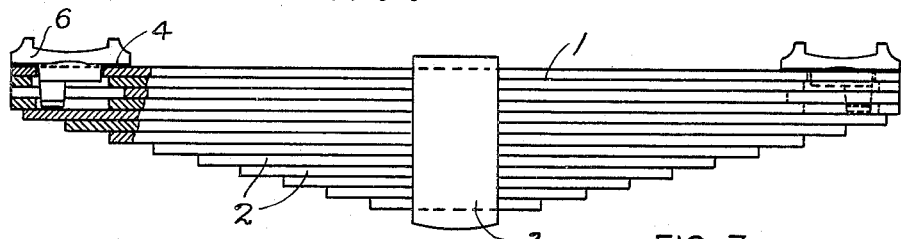
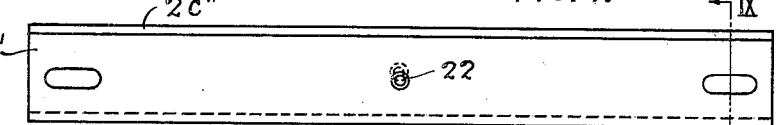
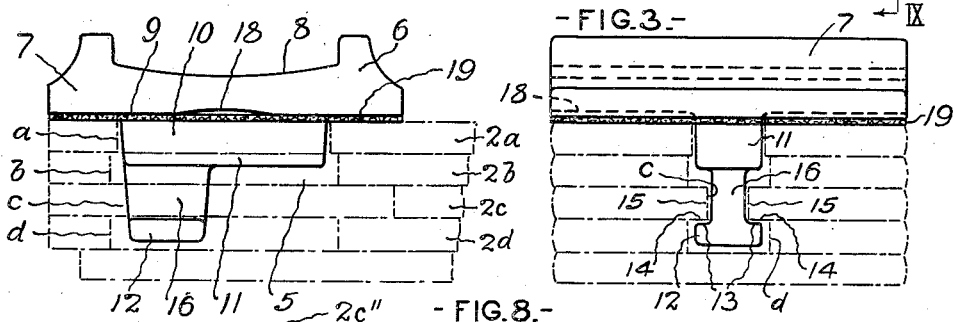
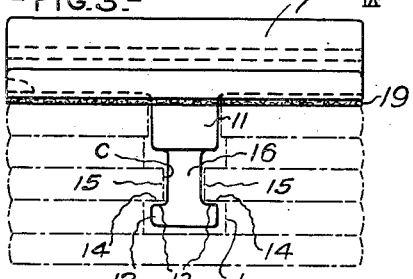
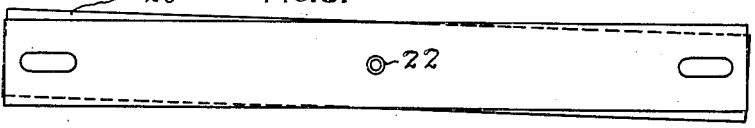
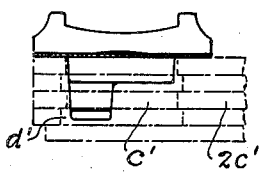
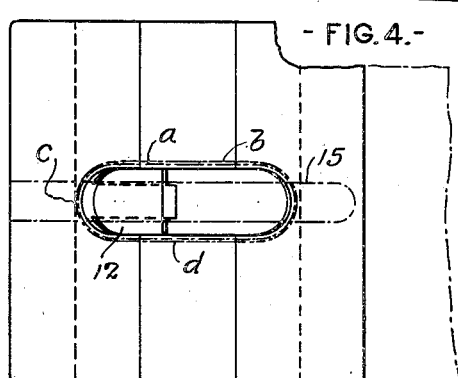
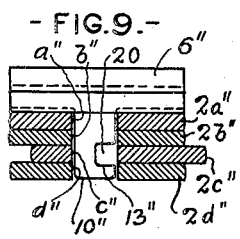
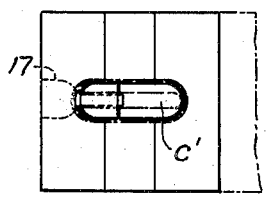
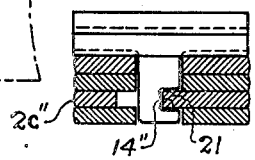
INVENTOR
Theodore R. Weber
BY
S. C. Yeaton
ATTORNEY Patented July 25, 1939

2,167,598

UNITED STATES PATENT OFFICE 2,167,598

LEAF SPRING

Theodore R. Weber, Latrobe, Pa., assignor to American Locomotive Company, New York, N. Y., a corporation of New York Application May 14, 1938, Serial No. 207,863

10 Claims. (Cl. 267—54)

This invention relates to leaf springs, and more particularly to the clips for the springs.

The principal object of the invention is to provide a clip having a lug so constructed and a spring so constructed for engaging the lug that one of the leaves or plates of the spring will serve as a locking plate effectually locking the clip and spring together, the locking plate being brought into its assembled position, in locking relation with the clip, by sliding it relative to the clip and to an adjacent plate.

A further object of the invention is to devise a clip and a spring end portion so designed as to minimize spring breakage.

Other objects of and advantages achieved by this invention will be apparent from the following description when considered in connection with the accompanying drawing which illustrates preferred embodiments of the invention, and wherein:—

Figure 1 is a front elevation of a spring, with an end portion thereof shown in section, illustrating the present invention; Figs. 2, 3 and 4 are enlarged views of the sectioned end portion of Fig. 1 showing the spring in dot and dash lines, Fig. 2 being a front elevation, Fig. 3 and end elevation viewed from the left of Fig. 2, and Fig 4 an inverted plan view of the clip; Figs. 5 and 6 show an end portion of a spring, in dot and dash lines, slightly modified, Fig. 5 being a view, in reduced scale, similar to Fig. 2, and Fig. 6 being an inverted plan view of Fig. 5; and Figs. 7 to 10 show another embodiment of the invention, Fig. 7 being a plan view of a spring plate assemblage showing the locking plate moved laterally for spring clip application, Fig. 8 being a similar view showing the locking plate rotated for spring clip application, Fig. 9 being a section on the line IX—IX of Fig. 7, showing the clip in elevation, and Fig. 10 being a view similar to Fig. 9 showing the locking plate in locking position.

The clip of the present invention is for use with leaf or plate springs and is not confined to any particular type of plate spring. Its chief application is to springs for vehicles, and principally for railway vehicles, wherein a clip (or clips) is usually employed to transmit weight of load transmitted by the spring. To this end the clip is connected with a hanger or some other weight transmitting member (not shown), which forms no part of the present invention, but for convenience the clip is shown of the design adapted for the usual form of strap hanger.

In the present instance the clip is shown, for convenience, in connection with a plate spring of the type commonly termed a semi-elliptic spring, this being the type of spring where the clip will have greatest application, a clip being employed at each end portion of the spring. In the present instance the clip is shown in connection with the straight plate type although it may be used with the curved plate type.

A characteristic of the clip is that when it is associated with the spring it has substantially no lateral movement in any direction. This may be accomplished however in various ways, and it is not intended that the invention shall be limited to the preferred way of accomplishing this presently to be described.

A novel feature of the invention is the manner in which the clip is locked to the spring to prevent its separation from the spring, which requires a construction wherein one of the spring plates, serving as a locking plate, may have sliding relative movement which is required in order to effect the assemblage of the clip in locked relation with the spring.

Referring to Figs. 1 to 4, a spring, indicated generally by the reference numeral 1, is here shown, comprising a stack of stepped plates 2 secured together by a band 3. The spring is provided at each end portion with a face 4 for a clip. The first four plates are designated respectively 2a, 2b, 2c and 2d. These plates at each end portion are provided respectively with openings, a, b, c and d, the four openings at each end combining to form a receptacle 5 extending from the adjacent face 4. Each opening extends lengthwise in a direction longitudinally of the spring, thereby providing a similarly extending relatively long receptacle. The end walls of the opening are preferably made rounding, as shown, to prevent unduly weakening the plates.

The receptacles and clips at both ends of the spring are preferably similar and they are so shown. Therefore a description of but one receptacle and the clip associated therewith will suffice. The clip, indicated generally by the reference numeral 6, comprises a body 7 having a face 8 for engagement with the weight transmitting member (not shown), this face, in the present instance, being in the usual form of a transversely extending channel which is commonly employed with a conventional strap hanger member (not shown). The body 7 overrides the receptacle 5 and has, opposite the face 8, a face 9 oppositely disposed to the spring face 4. The clip is provided with a lug 10 extending from the face 9 into the receptacle 5.

The clip may be associated with the spring in any suitable manner to prevent lateral movement of the clip in any direction relative to the spring. This is accomplished in the present instance by forming the lug 10 with a portion 11 adjacent the face 9 shaped to fit within the opening $a$ to provide only a working fit between the walls of the portion 11 and the corresponding walls of the opening $a$. The lug is further formed with a flanged portion 12 which provides shoulders 13 facing toward the body 7 and extending in a direction longitudinally of the spring. This flanged portion is disposed in the opening $d$. The opening $c$ is narrower than the opening $d$ thereby providing shoulders 14 facing away from the spring face 4, these shoulders 14 being oppositely disposed, each to one of the shoulders 13, and the walls 15 of the opening $c$ being disposed opposite a portion 16 of the lug adjacent the flanged portion 12. The shoulders 14 thus have locking coaction with the shoulders 13 preventing the clip from being removed from the spring, the plate $2c$ thus serving as a locking plate. While two pairs of co-acting shoulders are shown and have been described, only one pair may be employed if desired, the other pair in such case being eliminated.

Obviously provision must be made to enable the parts to be assembled with the shoulders of each pair in their oppositely disposed relation, as shown in Fig. 3. There may be various ways of providing for this, all depending, however, upon the common requirement that the locking plate $2c$ have sliding movement relative to the lug.

Figs. 7 to 10 show an embodiment involving only one pair of coacting shoulders at each end portion of the spring, and as each end portion is similar a description of but one will suffice. Here the clip $6''$ is provided with a lug $10''$ which is of uniform cross section. For convenience only the four spring plates, $2a''$, $2b''$, $2c''$ and $2d''$ forming the receptacle, are shown, the plate $2c''$ serving as the locking plate. Each of the plates is provided with an opening, indicated respectively by the reference letters $a''$, $b''$, $c''$ and $d''$. These openings are similar in shape to the cross-sectional shape of the lug but slightly larger to provide a spring working fit.

As viewed in Fig. 9 the opening $c''$ is offset in a direction transversely of its plate $2c''$ to the left. The openings together form the receptacle for the lug, and when the plate $2c''$ is slid to the right to bring its opening into alignment with the other openings, a clear passageway is provided through which the lug is inserted. The lug is provided with a slot 20 extending from the right face in a direction transversely of the spring and disposed in alignment with the plate $2c''$.

When the lug has been inserted into the receptacle the plate $2c''$ may be slid back to normal position as shown in Fig. 10, in which position the portion 21 of the plate adjacent the face of the opening $c''$ at the right enters the slot 20 and a spring working fit is provided therebetween. The slot 20 provides a shoulder $13''$ and the portion 21 provides a shoulder $14''$ which extends in a direction longitudinally of the spring and coact to retain the clip $6''$ against displacement.

Fig. 7 shows the plates in their positions shown in Fig. 9 where the plate $2c''$ is moved to bring its opening $c''$ into alignment with the openings in the other plates. In Fig. 7 this is done by moving the plate $2c''$ bodily in a direction transversely of the spring.

Usually in semi-elliptic springs each plate is locked with an adjacent plate by some interlocking means. In the present instance the well-known nib form of lock is shown, the nib being indicated by the reference numeral 22. The nib is provided by depressing the plate to form a projection at one face and a depression at the opposite face, each projection fitting into a depression. Obviously this interlocking would prevent the sliding movement of the plate $2c''$, as just described. Therefore the locking plate, during its sliding movement, must be held from engagement with its adjacent plates and it will require slight springing thereof to slide it into locking and unlocking positions. This is also true of the other embodiments of the invention where plate locking means at the centers of the plates are employed.

Fig. 8 shows a slightly different manner of moving the locking plate $2c''$. Here the locking engagement of the nibs 22 is not disturbed, and the plate $2c''$ is merely slightly rotated about the nib connection to locking and unlocking positions, there being sufficient play between the openings $c''$ and the lugs to permit this slight displacement of the plate $2c''$.

In the embodiment of Fig. 8 the openings $c''$ will be offset at opposite sides of the longitudinal center line and the slots 20 will be oppositely directed (which may be done by reversing one of the clips) in order to lock and unlock the lugs.

However where two pairs of coacting shoulders are employed, the assemblage of the parts could not be accomplished in the manner just described. The provision preferred for accomplishing this assemblage is shown in Figs. 1–4, which operates equally as well whether one or two pairs of coacting shoulders are employed. The shoulders of this embodiment (whether one or two pairs) extend in a direction longitudinally of the spring, and in the preferred embodiment provision is made for sliding the locking plate $2c$ in a direction longitudinally of the spring. This is accomplished by extending the opening $c$ of locking plate $2c$, at each end of the lug and opening it through the adjacent end of the plate. The plate $2c$ may then be slid in a direction longitudinally of the spring, to the right as viewed in Fig. 2, to an out-of-the-way position, thereby leaving the receptacle sufficiently open to enable the lug to be inserted therein with the flanged portion 12 disposed in the opening $d$. After the lug has been thus placed, the plate $2c$ is slid in the opposite direction thus threading the lug portion 16 through the opening $c$ until the plate $2c$ reaches its normal position with the shoulder or shoulders 14 thereof in locking relation with the lug shoulder or shoulders 13, as the case may be.

A slightly modified spring construction providing another manner of assembling the parts is shown in Figs. 5 and 6. Here the opening $c'$ is provided at one end of the lug with an enlargement, and the locking plate $2c'$, is slid in a direction longitudinally of the spring relative to the lug, until the enlargement comes opposite the flanged portion 12. The enlargement is disposed in the opening $c'$ so that, when it is thus moved, it will register with the flanged portion 12, and it is made sufficiently large to permit the flanged portion to be threaded therethrough to position the lug within the receptacle and the flanged portion within the opening $d'$. After the lug has been thus positioned the plate $2c'$ is slid in the opposite direction to normal locking position in a manner similar to that of the locking plate $2c$ already described.

The enlargement may be formed in the opening c' at either end of the lug. As shown in Figs. 5 and 6 the opening c' is formed with an enlargement 17 disposed at the left of the lug, and as insufficient room is provided, in the present instance, at this end for the full enlargement, it is shown opening at the adjacent end of the locking plate 2c'. This modified structure involving the enlargement in the opening c' may be employed where either one or two pairs of coacting shoulders 13—14 are used.

Where two similar clips are employed, the same locking plate, illustrated by the plate 2c, Fig. 1, will be used as such for each clip. If assemblage of the parts as first above described, which is accomplished by transverse sliding movement of the locking plate, is resorted to, the assemblage of either clip will not depend ordinarily upon the construction of the receptacle at the opposite end of the spring. Where however the assemblage is accomplished by either of the other two ways already described, involving sliding movement of the locking plate in a direction longitudinally of the spring, the openings in each end portion of the common locking plate will necessarily be extended at each end of each lug in order to provide for the required longitudinal sliding movements of the locking plate necessary for assembling each of the clips.

Whether or not the same locking plate is employed for both clips, it is essential that, in cases requiring the longitudinal sliding movement of the locking plate of a clip, this plate be suitably constructed at both ends so that it may have this required movement. Where but one clip is employed (should occasion arise) the opening in the locking plate need be extended only at one end of the clip lug.

After the clips have been assembled, and the spring plates are in their proper relative positions, the plates are secured together, which may be in any desired manner. In the present instance the plates are secured together by the beformentioned band 3, as in usual practice, this feature forming no part of the present invention, except it should be noted that the plates are not permanently secured together until after the clips have been assembled in their locked positions, which is a feature contrary to usual practice. To accomplish this in the present instance the plates may be held temporarily by a clasp, or other means (not shown). The spring may then be threaded from one end thereof through the band, which is ordinarily first heated to the required setting temperature, and when the band is in its proper position it may be compressed according to usual practice.

In describing the invention, for example the embodiment of Figs. 1–4, it has been stated that the flanged portion 12 is disposed in the opening of the single plate 2d; that there is a single locking plate 2c for the lug; that the lug portion 11 engages with the walls of the opening of the single plate 2a; and that the openings in the four adjacent plates constitute the receptacle. It will be understood that the invention is not limited in these regards. Instead of one plate, two or more plates may be employed in any of the instances mentioned, and instead of four plates constituting the receptacle, a different number of plates may be employed for this, all as may be desired in any instance. It will be further noted that the lug portion 11, as shown, extends part way into the opening of plate 2b, a space thus being left free between the lug portion 11 and the plate 2c; there is also a space preferably left in the opening d adjacent the shoulders 13 and also adjacent the face of the flanged portion 12 opposite the shoulders 13. This permits, within certain limits, plates of varying thicknesses to be employed, and similar provision may be employed in each of the embodiments.

A spring of the present invention has the advantage that when it is shipped by the manufacturer it is complete, due to the fact that the clips are non-detachable parts of the spring and must be assembled and locked prior to the completion of the spring. This insures the manufacturer against the user substituting inferior or unsuitable types of clips, and enables the manufacturer to guaranty, with comparative safety, spring replacements in case of breakage at the clip areas.

In modern railway vehicle practice heavier loads and higher speeds are prevalent, and this has been largely responsible for revealing the inadequacy of old conventional designs of clips. In the case of railway vehicle springs of the strap hanger and similar types most of the failures are at the spring plate openings beneath the hangers in designs where the clip rests directly upon the spring plate. Due to the cost element which enters into the manufacture of clips it is not feasible to accurately machine, nor in fact to machine at all, the seating face on the clip body. Therefore, instead of possessing a perfectly flat face, irregularities are often present. Where the clip seats directly upon the spring plate, making metal to metal contact, and there happens to be a pronounced projecting irregularity at the central portion of the seating face of the clip, this will support most of the load and take the shocks transmitted through the clip. As such projection is disposed in line with the plate openings, which present the weakest part of the plates, fractures of the plates are very apt to result. To provide against this in the present instance, where there is metal to metal contact, a depression or recess 18 is provided in the seating face of the clip extending transversely thereof midway between the ends. On account of the presence of the lug this recess is made in two parts, each exending from the adjacent face of the lug to the adjacent side of the body of the clip. The recess prevents contact throughout its area of the clip with the spring, the contact then being at each end of the clip beyond the recess where the spring is better able to withstand the injurious effects of irregularities in the seating face of the clip, thereby minimizing spring failures. The recess or depression is not confined to the particular type of clip shown but may be used to advantage with other types of clips wherever occasion arises.

In leaf springs of which the type shown is an exemplification, there is considerable friction between the leaves when the spring is in service. While the friction is desirable as a damping or energy absorbing means, nevertheless, before it is overcome, the spring acts as a rigid connection. This friction in some types of springs is of large proportions and often impact forces of high magnitude are developed before normal spring action occurs.

Furthermore the spring steel is necessarily a high strength material, of high elastic properties, and limited ductility, and is therefore especially subject to abuse through the uneven distribution of the load due to the irregular seating face on the clip already mentioned. To meet these and other conditions a cushioning or shock absorbing resilient pad 19 is interposed between the clip body and the adjacent spring leaf. The pad further serves to more evenly distribute the load, especially where a metal face adjacent thereto is irregular or uneven. The pad may be employed in conjunction with the recess 18 or without the recess as desired, and for convenience of illustration they are shown together, but where the pad is used the recess will not, as a general rule, be necessary. The recess is employed principally where there is metal to metal contact, in which case obviously no pad will be employed. The pad may be made of any suitable resilient material, as for instance a material known as Fabreeka; also rubber or rubber compositions may be employed. There should be sufficient clearance, where necessary, between opposite plate and lug faces, to permit freedom for the pad to function as a cushioning member. Like the depression 18 the resilient pad is not confined to the particular type of clip shown but also has general application with other types of clips where occasion arises.

As to features of advantage that the pad possesses may be mentioned the following:

(1) Elimination of impact forces upon the spring plates due to sudden dislodgement of plate friction; (2) elimination of small vibrations passing through spring due to metal contact and stiffness as a result of inherent friction; and (3) provision of proper bearing and distribution of load between end clip and adjacent spring plate, avoiding expensive machining of clip seating faces.

While there have been hereinbefore described approved embodiments of this invention, it will be understood that many and various changes and modifications in form, arrangement of parts and details of construction thereof may be made without departing from the spirit of the invention and that all such changes and modifications as fall within the scope of the appended claims are contemplated as a part of this invention.

The invention claimed and desired to be secured by Letters Patent is:

1. The combination with a leaf spring having an exterior face and a receptacle extending from said face, said receptacle being provided with a shoulder extending from a longitudinal side wall thereof toward the opposite side wall and terminating part way across said receptacle, said shoulder facing away from said face, of a clip comprising a body disposed opposite said face, a lug extending from said body into said receptacle, and a flange projecting laterally from said lug, providing a shoulder facing toward said body and extending toward said longitudinal side wall, opposed to and in locking relation with said receptacle shoulder for preventing removal of said clip, said receptacle shoulder being disposed between said flange and said body.

2. The combination with a leaf spring having an exterior face and a receptacle extending from said face, said receptacle being provided with oppositely disposed shoulders extending from opposite longitudinal side walls thereof toward each other and terminating part way across said receptacle in spaced relation, said shoulders facing away from said face, of a clip comprising a body disposed opposite said face, a lug extending from said body into said receptacle, and a flange projecting laterally from each side of said lug, each flange providing a shoulder facing toward said body and extending toward the longitudinal side wall adjacent thereto, opposed to and in locking relation with the receptacle shoulder adjacent thereto for preventing removal of said clip, each receptacle shoulder being disposed between the flange adjacent thereto and said body.

3. A plate spring comprising superposed plates; faces for clips disposed one at each end portion of said spring upon the same side thereof; a receptacle, extending from each of said faces into said spring, formed by providing an opening in each of a plurality of adjacent plates; a clip, at each of said spring faces, having a body over-riding the receptacle adjacent thereto and a lug, disposed in said adjacent receptacle, having a flanged portion providing a shoulder facing toward said body and extending in a direction longitudinally of said spring, one of said plurality of plates being a clip-locking plate and having a clip-locking part adjacent each of its openings for the lug adjacent thereto, said part being provided with a face opposite the shoulder, and another face opposite a lug portion adjacent said flanged portion, of said adjacent lug, each of the openings in said clip-locking plate being extended beyond each end of the lug adjacent thereto permitting said clip-locking plate to slide, in opposite directions longitudinally of said spring, relative to said lugs, said extended openings opening through the respective outer ends of their plate whereby, by said longitudinal movements, each said lug may be threaded through its adjacent extended opening and said locking plate thereby brought into locking relation therewith; and means for securing said spring plates together, with said clips in their locked positions.

4. A plate spring comprising superposed plates; faces for clips disposed one at each end portion of said spring upon the same side thereof; a receptacle, extending from each of said faces into said spring, formed by providing an opening in each of a plurality of adjacent plates; a clip, at each of said spring faces, having a body over-riding the receptacle adjacent thereto and a lug, disposed in said adjacent receptacle, having oppositely disposed flanged portions providing shoulders facing toward said body and extending in a direction longitudinally of said spring, one of said plurality of plates being a clip-locking plate and having oppositely disposed clip-locking parts adjacent each of its openings at opposite sides thereof for the lug adjacent thereto, said parts being provided each with a face opposite the shoulder adjacent thereto, and another face opposite a lug portion adjacent said flanged portion, of said adjacent lug each of the openings in said clip-locking plate being extended beyond each end of the lug adjacent thereto permitting said clip-locking plate to slide, in opposite directions longitudinally of said spring, relative to said lugs, said extended openings opening through the respective outer ends of their plate whereby, by said longitudinal movements, each said lug may be threaded through its adjacent extended opening and said locking plate thereby brought into locking relation therewith; and means for securing said spring plates together, with said clips in their locked positions.

5. A plate spring comprising superposed plates; a face for a clip disposed at an end portion of said spring; a receptacle, extending from said face into said spring, formed by providing an opening in each of a plurality of adjacent plates; a clip, at said spring face, having a body over-riding said receptacle and a lug, disposed in said receptacle, having a flanged portion providing a shoulder facing toward said body and extending in a direction longitudinally of said spring, one of said plurality of plates being a clip-locking plate and having a clip-locking part adjacent its opening, provided with a face opposite said shoulder, and another face opposite the lug portion adjacent said flanged portion, of said lug, the opening in said clip-locking plate being extended permitting said clip-locking plate to slide, in opposite directions longitudinally of said spring, relative to said lug, said extended opening opening through the adjacent outer end of its plate whereby, by said longitudinal movements, said lug may be threaded through its extended opening and said locking plate thereby brought into locking relation therewith; and means for securing said spring plates together, with said clip in its locked position.

6. A plate spring comprising superposed plates; a face for a clip disposed at an end portion of said spring; a receptacle, extending from said face into said spring, formed by providing an opening in each of a plurality of adjacent plates; a clip, at said spring face, having a body overriding said receptacle and a lug, disposed in said receptacle, having a flanged portion providing a shoulder facing toward said body and extending in a direction longitudinally of said spring, one of said plurality of plates being a clip-locking plate and having a clip-locking part adjacent its opening, provided with a face opposite said shoulder, and another face opposite the lug portion adjacent said flanged portion, of said lug, the opening in said clip-locking plate being extended and being provided with an enlargement beyond said flanged portion permitting said clip-locking plate to slide, in opposite directions longitudinally of said spring, relative to said lug, and said flanged portion to be threaded through said enlargement whereby, by said longitudinal movements and said threading of said flanged portion, said clip and said locking plate may be brought into locking relation; and means for securing said spring plates together, with said clip in its locked position.

7. A plate spring having a plurality of consecutive plates including an outer plate, provided each at a corresponding end portion with an opening, said openings combining to form a receptacle having a mouth open to the exterior at the outer face of said outer plate; a clip having a body provided with an outer face and an inner face, a lug projecting from said inner face, and a flange projecting laterally from said lug providing a shoulder facing said body inner face, said body inner face being disposed opposite said outer plate outer face and said lug being housed in said receptacle and being insertible therein and removable therefrom through said receptacle mouth, an inner plate of said plurality of plates having a clip-locking part adjacent its said opening disposed between said mouth and said flange abreast of said shoulder in locking relation therewith whereby said lug is held against removal from said receptacle through said mouth, a wall of said receptacle confining said lug against freeing movement, thereby preventing freeing of said shoulder from said inner plate locking part, said end portion of said inner plate being adapted by relative sliding movement imparted thereto to free its said locking part from said shoulder leaving said receptacle free for the removal of said lug therefrom and for insertion of said lug therein; and means holding said inner plate end portion against said relative sliding movement, whereby during said holding by said means, removal of said lug is prevented.

8. A plate spring having a plurality of consecutive plates including an outer plate, provided each at a corresponding end portion with an opening, said openings combining to form a receptacle having a mouth open to the exterior at the outer face of said outer plate; a band firmly holding all said plurality of plates together against sliding relative displacement movement therebetween; a clip having a body provided with an outer face and an inner face, a lug projecting from said inner face, and a flange projecting laterally from said lug providing a shoulder facing said body inner face, said body inner face being disposed opposite said outer plate outer face and said lug being housed in said receptacle and being insertable therein and removable therefrom through said receptacle mouth, an inner plate of said plurality of plates having a clip-locking part adjacent its said opening disposed between said mouth and said flange abreast of said shoulder in locking relation therewith whereby said lug is held against removal from said receptacle through said mouth, a wall of said receptacle confining said lug against freeing movement, thereby preventing freeing of said shoulder from said inner plate locking part, said inner plate being adapted to have its locking part moved in locking relation with said flange shoulder only by sliding relative movement of said end portion of said inner plate and only before said band has been applied, said inner plate being immovable for freeing its said locking part from locking engagement with said shoulder after said band has been applied, whereby said clip is permanently locked to said spring upon applying said band.

9. A plate spring having a plurality of consecutive plates including an outer plate, provided each at a corresponding end portion with an opening, said openings combining to form a receptacle having a mouth open to the exterior at the outer face of said outer plate; a band firmly holding all said plurality of plates together against sliding relative displacement movement therebetween; a clip having a body provided with an outer face and an inner face, a lug projecting from said inner face, and a flange projecting laterally from said lug providing a shoulder facing said body inner face, said body inner face being disposed opposite said outer plate outer face and said lug being housed in said receptacle and being insertable therein and removable therefrom through said receptacle mouth, an inner plate of said plurality of plates having a clip-locking part adjacent its said opening disposed between said mouth and said flange abreast of said shoulder in locking relation therewith whereby said lug is held against removal from said receptacle through said mouth, a wall of said receptacle confining said lug against freeing movement, thereby preventing freeing of said shoulder from said inner plate locking part, and said band preventing freeing movement of said inner plate locking part, thereby preventing freeing of said locking part from said shoulder, whereby said clip is unremovably secured to said spring, said body, flange and locking part cooperating to prevent substantial spreading of the end portions of said plates between said flange and said body and to prevent the substantial tilting of said clip relative to said outer plate.

10. A plate spring having a plurality of consecutive plates including an outer plate, provided each at a corresponding end portion with an opening, said openings combining to form a receptacle having a mouth open to the exterior at the outer face of said outer plate, said receptacle having a side wall extending in a direction longitudinally of said spring; a band securing said plates together; a clip having a lug disposed in said receptacle, said lug having a side wall opposite said receptacle side wall and a flange projecting from said lug side wall toward said receptacle side wall and joined to said lug along a line running in a direction longitudinally of said spring, said receptacle having a portion of one of said spring plates projecting from said receptacle side wall into said receptacle toward said lug between said flange and said mouth overriding said flange and extending longitudinally of said spring, the opposite side wall of said receptacle opposing movement of said flange away from said projecting portion, and said band preventing movement of the plate providing said projecting portion away from said flange whereby said projecting portion will permanently lock said lug in said receptacle.

THEODORE R. WEBER.